(12) United States Patent
Hadley et al.

(10) Patent No.: US 12,537,204 B2
(45) Date of Patent: Jan. 27, 2026

(54) HYBRID MATERIAL ANODE CURRENT COLLECTOR FOR ALKALINE BATTERIES

(71) Applicant: Energizer Brands, LLC, St. Louis, MO (US)

(72) Inventors: John Hadley, Madison, WI (US); Matthew Hennek, Stoughton, WI (US); Dustin Breister, Madison, WI (US)

(73) Assignee: Energizer Brands, LLC, St. Louis, MO (US)

( * ) Notice: Subject to any disclaimer, the term of this patent is extended or adjusted under 35 U.S.C. 154(b) by 455 days.

(21) Appl. No.: 18/057,639

(22) Filed: Nov. 21, 2022

(65) Prior Publication Data

US 2024/0170677 A1    May 23, 2024

(51) Int. Cl.
| | |
|---|---|
| *H01M 4/24* | (2006.01) |
| *H01M 4/66* | (2006.01) |
| *H01M 4/75* | (2006.01) |
| *H01M 4/76* | (2006.01) |
| *H01M 4/78* | (2006.01) |
| *H01M 4/02* | (2006.01) |

(52) U.S. Cl.
CPC ............ *H01M 4/667* (2013.01); *H01M 4/24* (2013.01); *H01M 4/662* (2013.01); *H01M 4/75* (2013.01); *H01M 4/76* (2013.01); *H01M 4/78* (2013.01); *H01M 2004/027* (2013.01); *H01M 2004/028* (2013.01)

(58) Field of Classification Search
CPC ........ H01M 4/667; H01M 4/662; H01M 4/24; H01M 4/78; H01M 50/20
See application file for complete search history.

(56) References Cited

U.S. PATENT DOCUMENTS

| | | |
|---|---|---|
| 5,639,578 A | 6/1997 | Urry |
| 7,364,819 B2 | 4/2008 | Fan |
| 7,740,979 B2 | 6/2010 | Johnson |
| 7,807,296 B2 | 10/2010 | Vu et al. |
| 8,586,244 B2 | 11/2013 | Fensore et al. |

(Continued)

FOREIGN PATENT DOCUMENTS

| | | |
|---|---|---|
| JP | 2021-002439 A | 1/2021 |
| WO | 2014/119663 A1 | 8/2014 |

OTHER PUBLICATIONS

Machine Translation of: Suzuki et al., JP 2021-002439A, Jan. 7, 2021.*

(Continued)

*Primary Examiner* — Kenneth J Douyette
(74) *Attorney, Agent, or Firm* — Alston & Bird LLP

(57) ABSTRACT

Systems, apparatuses, and/or the like are provided. In some embodiments, an electrochemical cell may include a container, a ring-shaped cathode disposed within the container, wherein the ring-shaped cathode defines an open interior, an anode disposed within the open interior of the ring-shaped cathode, a separator disposed between the cathode and the anode, an electrolyte solution, and a current collector electrically connected with a portion of the container, wherein the current collector is positioned at least partially within the anode. For example, current collectors may include a base including a first material that is fixedly attached to the portion of the container and a zinc component composed of a second material and fixedly attached to the base.

18 Claims, 10 Drawing Sheets

(56) References Cited

U.S. PATENT DOCUMENTS

| | | |
|---|---|---|
| 9,472,807 B2 | 10/2016 | Marple et al. |
| 11,081,763 B2 | 8/2021 | Marcaly |
| 11,532,809 B2 | 12/2022 | Slezak |
| 11,611,072 B2 | 3/2023 | Zheng et al. |
| 2003/0162095 A1* | 8/2003 | Huang .................... H01M 4/38 |
| | | 429/246 |
| 2005/0271941 A1* | 12/2005 | Bushong ................. H01M 4/50 |
| | | 429/219 |
| 2006/0204839 A1* | 9/2006 | Richards ............... H01M 4/667 |
| | | 429/246 |
| 2010/0092857 A1 | 4/2010 | Phillips et al. |
| 2015/0364789 A1 | 12/2015 | Ogawa et al. |
| 2018/0159094 A1* | 6/2018 | Audebert ............ H01M 50/105 |
| 2020/0411878 A1 | 12/2020 | Huang et al. |
| 2021/0119264 A1 | 4/2021 | Gibson et al. |
| 2023/0107553 A1 | 4/2023 | Huang et al. |

OTHER PUBLICATIONS

ISA/220—Notification of Transmittal or Search Report and Written Opinion of the ISA, or the Declaration Mailed on Feb. 28, 2024 for WO Application No. PCT/US23/078907, 13 page(s).

* cited by examiner

| | Control | | Thin Zinc -1.1% Anode Fig 3A & 4A | | Wide Zinc -2% Anode Fig 3B & 4B | | Wide Zinc, Downshifted -2% Anode Fig 3C & 4C | |
|---|---|---|---|---|---|---|---|---|
| 1500mW/650mW Digital Camera (Pulses) | 128.1 | 100% | 144.2 | 113% | 152.4 | 119% | 152.0 | 119% |
| 750 mA 2M/ 8H/D Grooming (Hours) | 1.5 | 100% | 1.5 | 103% | 1.6 | 112% | 1.5 | 103% |
| 3.9 ohm 1H/D Toy (hours) | 8.8 | 100% | 8.9 | 101% | 8.8 | 100% | 8.8 | 100% |
| 3.9 ohm Lift Lighting (hours) | 8.4 | 100% | 8.5 | 101% | 8.5 | 101% | 8.5 | 100% |
| 250 mA 1h/d CD/MD/Game (hours) | 9.6 | 100% | 9.7 | 101% | 9.7 | 101% | 9.7 | 101% |
| 100 mA 1h/d Digital Audio (hours) | 27.6 | 100% | 27.6 | 100% | 27.6 | 100% | 27.6 | 100% |
| 50 mA 1H/7H Remote/Radio (hours) | 55.5 | 100% | 55.7 | 100% | 55.7 | 100% | 55.7 | 100% |
| ANSI-15 | 100.0% | | 101.5% | | 104.7% | | 103.3% | |

FIG. 5

HYBRID MATERIAL ANODE CURRENT COLLECTOR FOR ALKALINE BATTERIES

TECHNICAL FIELD

The present disclosure relates generally to alkaline batteries, and more particularly to materials used in anode current collectors for alkaline batteries.

BACKGROUND

Alkaline electrochemical cells are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain. Due to the increased use of high drain devices (e.g., high-drain motorized devices), it is desirable for a manufacturer to produce a battery that possesses desirable high drain discharge properties.

As the shape and size of the batteries are fixed, battery manufacturers must modify cell characteristics to provide increased performance. Attempts to address the problem of how to improve a battery's performance in a particular device, have usually involved changes to the cell's internal construction. For example, cell construction has been modified by increasing the quantity of active materials utilized within the cell.

However, beneficial increases in high-rate service that result from increasing the amount of electrode material have been minimal. Therefore, a need still exists for alkaline electrochemical cells having increased high-rate service by increasing the efficiency of discharge.

BRIEF SUMMARY

According to various embodiments, an electrochemical cell is provided. In some embodiments, the cell includes a container, a ring-shaped cathode disposed within the container, wherein the ring-shaped cathode defines an open interior, an anode disposed within the open interior of the ring-shaped cathode, a separator disposed between the cathode and the anode, an electrolyte solution, a current collector electrically connected with a portion of the container, wherein the current collector is positioned at least partially within the anode, and wherein the current collector includes a base composed of a first material and fixedly attached to the portion of the container, and a zinc component composed of a second material and fixedly attached to the base.

In some embodiments, the zinc component includes one or more pieces of zinc foil that are fixedly attached at one or more points on the base of the current collector.

In some embodiments, the zinc component is welded, soldered, friction fit, or crimped to the base.

In some embodiments, the zinc component is welded to the base by a welding method selected from a group consisting of: ultrasonic welding, electric welding, and friction welding.

In some embodiments, the zinc component is fixedly attached to the base such that at least a surface area of the base is encased within the zinc component.

In some embodiments, the base is cylindrically shaped, and the surface area of the base that is encased within the zinc component is greater than the surface area of the base that is not encased within the zinc component.

In some embodiments, the surface area of the base that is encased within the zinc component forms a cylinder with a diameter larger in diameter than a cylinder formed by the surface area of the base that is not encased within the zinc component.

In some embodiments, the zinc component includes one or more zinc plates that are fixedly attached at one or more locations on the base.

In some embodiments, the first material is a brass alloy.

In some embodiments, the anode includes a first portion and a second portion, wherein the first portion is composed of a first anode material and the second portion is composed of a second anode material. In some embodiments, the base ranges from about 20 mm to about 40 mm in length.

In some embodiments, the design of the cathode and the anode utilizes a high zinc loading design of about 62% to about 72% by weight.

According to various embodiments, there is provided a current collector electrically connected with a portion of a container. In some embodiments, the current collector is positioned at least partially within an anode. In some embodiments, the current collector includes a base fixedly attached to the portion of the container and a zinc component composed of a second material, wherein the zinc component is fixedly attached to the base.

In some embodiments, the zinc component includes one or more pieces of zinc foil that are fixedly attached at one or more points on the base.

In some embodiments, the zinc component is welded, friction fit, or crimped to the base.

In some embodiments, the zinc component is welded to the base by a welding method selected from a group consisting of: ultrasonic welding, electric welding, and friction welding.

In some embodiments, the zinc component is fixedly attached to the base such that at least a surface area of the base is encased within the zinc component.

In some embodiments, the base is cylindrically shaped, and the surface area of the base that is encased within the zinc component is greater than a surface area of the base that is not encased within the zinc component.

The above summary is provided merely for purposes of summarizing some example aspects to provide a basic understanding of some aspects of the disclosure. Accordingly, it will be appreciated that the above-described aspects are merely examples. It will be appreciated that the scope of the disclosure encompasses many potential aspects in addition to those here summarized, some of which will be further described below.

BRIEF SUMMARY OF THE DRAWINGS

FIG. 5 is a table illustrating example test results of performance rates for various devices using an example anode current collector in accordance with some embodiments.

DETAILED DESCRIPTION AND DISCUSSION

Figure 1:
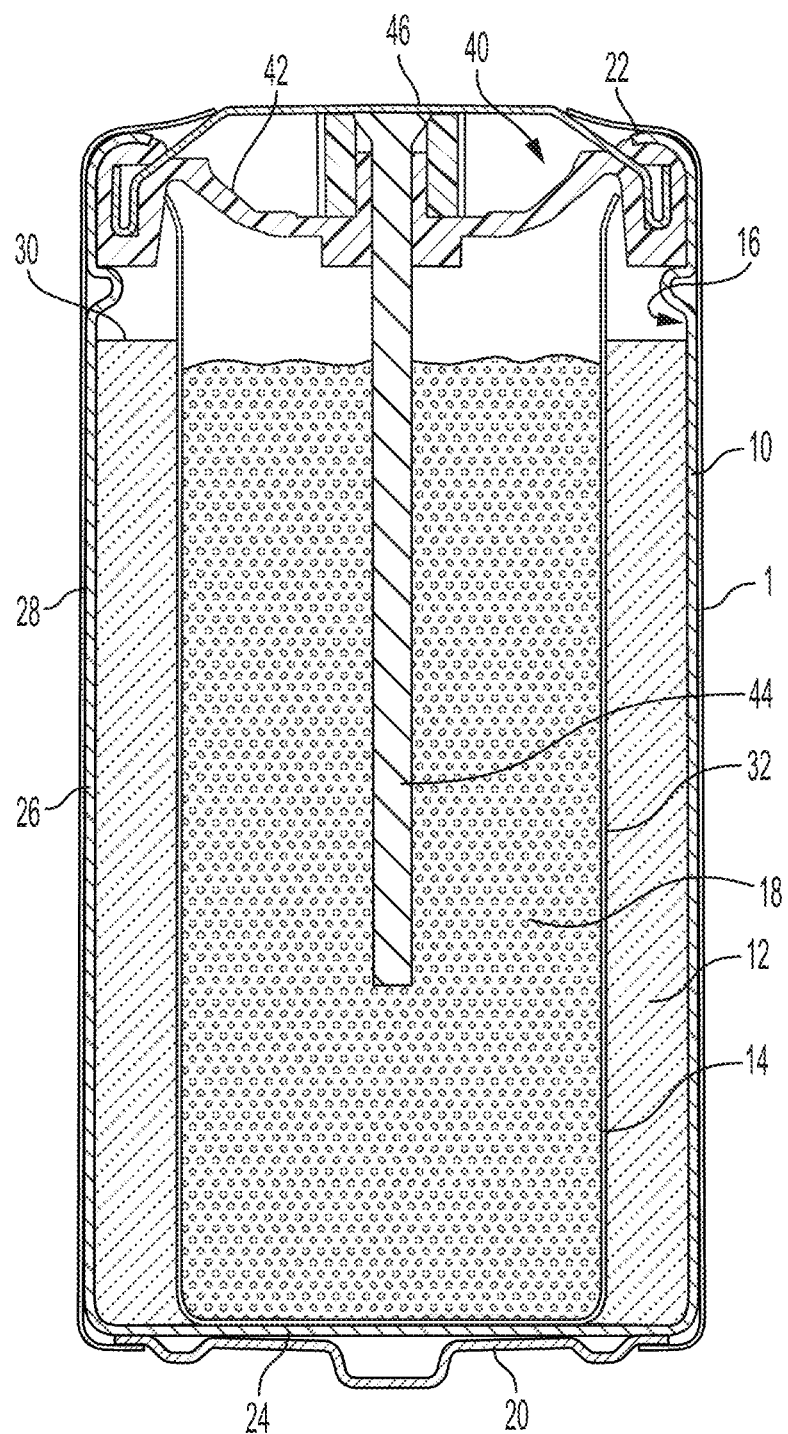
FIG. 1 is a cross-sectional, elevational view of an example alkaline electrochemical cell in accordance with some embodiments.

Various embodiments will now be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item. For example, "an organic additive" may refer to two or more organic additives.

Each embodiment disclosed herein is contemplated as being applicable to each of the other disclosed embodiments. All combinations and sub-combinations of the various elements described herein are within the scope of the embodiments.

It is understood that where a parameter range is provided, all integers and ranges within that range, and tenths, hundredths, thousandths, ten-thousandths, and hundred-thousandths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 7-10%, 5.1%-9.9%, and 5.01%-9.99%. As another example, "0.00001-1 M" includes 0.00005-0.0001 M and 0.001-0.01 M.

As used herein, "about" in the context of a numerical value or range means within ±10% of the numerical value or range recited or claimed.

As used herein, "metal additive" refers to a metal-containing compound that is added to the electrolyte and/or cathode. Examples are metal salts and metal oxides. As used herein, "metal ion" refers to an ion of any element which may be considered a metal, including, but not limited to, metals, transition metals (any element in groups 3-12 of the periodic table, particularly groups 4-11), lanthanides, actinides, alkaline earth metals, and alkali metals. "Metal salt" refers to any salt formed from a metal ion. "Metal oxide" refers to any compound comprising a metal ion and oxygen in an oxidation state of −2. Examples of metals suitable for the metal salts, metal oxides, and metal ions of the current invention include magnesium (Mg), barium (Ba), nickel (Ni), copper (Cu), aluminum (Al), and cerium (Ce).

As used herein, "improvement" with respect to specific capacity means that the specific capacity is increased. Generally, an "improvement" of a property or metric of performance of a material or electrochemical cell means that the property or metric of performance differs (compared to that of a different material or electrochemical cell) in a manner that a user or manufacturer of the material or cell would find desirable (e.g., costs less, lasts longer, provides more power, more durable, easier or faster to manufacture, etc.).

As used herein, "specific capacity" refers to the total amount of charge in an electrochemical cell when discharged at a particular rate. This is typically measured in ampere hours.

As used herein, "run-time" refers to the length of time that an electrochemical cell will be able to provide a certain level of charge.

The embodiments will be better understood by reference to the figures, which show various embodiments of a cylindrical electrochemical cell in elevational cross-section, with the cell having a nail-type or bobbin-type construction and dimensions comparable to a conventional LR6 (AA) size alkaline cell. It will be understood that the embodiments described herein apply to both Alkaline (Zn/MnO2) and Alkaline-P (Zn/MnO2+other) chemistries. The materials and designs for the components of the electrochemical cell illustrated in FIG. 1 are for the purposes of illustration, and other materials and designs may be substituted. The described, non-limiting embodiment is directed to an alkaline electrochemical cell comprising manganese dioxide in the cathode as an active material.

In FIG. 1, an electrochemical cell 1 is shown, including a container or can 10 having a closed bottom end 24, a top end 22 and sidewall 26 therebetween. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, preferably plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 preferably contains a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component extending into the first electrode 18. Current collector 44 is made of one or more metals or metal alloys, such as copper or brass. In certain embodiments, portions of the current collector 44 may be a conductively plated nail/rod having a metallic or plastic core that is plated with the one or more metals or metal alloys. Other suitable materials can be utilized. In various embodiments described in detail below, at least a portion of the current collector 44 comprises zinc. As discussed below, the zinc portion may be incorporated into, fastened to, or otherwise attached to an elongated nail of a different material (e.g., brass). Current collector 44 is inserted through a hole (e.g., a centrally located hole) in closure member 42.

First electrode 18 is preferably a negative electrode or anode. The negative electrode includes a mixture of one or more active materials, an electrically conductive material, optionally solid zinc oxide, and a surfactant. The negative electrode can optionally include other additives, for example a binder or a gelling agent, and the like.

Zinc is an example main active material for the negative electrode of the embodiments. Mercury, aluminum, silicon, lithium, and magnesium may also be used, in alternate embodiments. Preferably, the volume of active material utilized in the negative electrode is sufficient to maintain a desired particle-to-particle contact and a desired anode to cathode (A:C) ratio. Zinc may also be incorporated into the current collector 44, as will be described in detail later in this disclosure.

Particle-to-particle contact should be maintained during the useful life of the battery. If the volume of active material in the negative electrode is too low, the cell's voltage may suddenly drop to an unacceptably low value when the cell is powering a device. The voltage drop is believed to be caused by a loss of continuity in the conductive matrix of the negative electrode. The conductive matrix can be formed from undischarged active material particles, conductive electrochemically formed oxides, or a combination thereof. A voltage drop can occur after oxide has started to form, but before a sufficient network is built to bridge between all active material particles present.

Contact between the zinc active material and the current collector should be maintained to ensure appropriate conductivity within the electrochemical cell. The active material should be provided to ensure proper contact both between active material particles and between the active material and the current collector, even as the cell is discharged (which may cause expansion of the active material as it is discharged) and/or the cell is vibrated.

Zinc suitable for use in the embodiments may be purchased from a number of different commercial sources under various designations, such as BIA 100, BIA 115. Umicore S. A., Brussels, Belgium is an example of a zinc supplier. In a preferred embodiment, the zinc powder generally has 25 to 40 percent fines less than 75 μm, and preferably 28 to 38 percent fines less than 75 μm. Generally lower percentages of fines will not allow desired high-rate service to be realized and utilizing a higher percentage of fines can lead to increased gassing. A correct zinc alloy is needed in order to reduce negative electrode gassing in cells and to maintain test service results.

A surfactant that is either a nonionic or anionic surfactant, or a combination thereof is usually present in the negative electrode. It has been found that anode resistance is increased during discharge by the addition of solid zinc oxide alone, but is mitigated by the addition of the surfactant. The addition of the surfactant increases the surface charge density of the solid zinc oxide and lowers anode resistance as indicated above.

One example surfactant is DISPERBYK-190 from BYK-Chemie GmbH of Wesel, Germany. The surfactant is present in an amount sufficient to disperse the solid zinc oxide, preferably about 0.00064 to about 0.20 weight percent or more, based on the total weight of the negative electrode. DISPERBYK-190 is believed to be a solution including a water soluble, high molecular weight block copolymer including one or more functional groups, believably at least two different types of functional groups. The surfactant has an anionic/nonionic character due to the respective functional groups thereof. It is further believed that the number average molecular weight of a block copolymer DISPERBYK-190 is greater than 1000 measured utilizing gel permeation chromatography. Water solubility may be offset by the presence of a hydrophobic component if present in the electrode composition. In one embodiment, the surfactant is utilized in an amount from about 10 to about 100 ppm and preferably from about 15 to about 50 ppm of zinc utilized in the negative electrode. It is believed that DISPERBYK-190 does not contain any organic solvents and is, therefore, suitable for aqueous systems. DISPERBYK-190 has an acid value in mg KOH/g of 10 and a density of 1.06 g/ml at 20° C.

In an embodiment, the aqueous electrolyte is an aqueous alkaline electrolyte, and comprises an alkaline metal hydroxide such as potassium hydroxide (KOH), sodium hydroxide (NaOH), or the like, or mixtures thereof. Potassium hydroxide is preferred. The alkaline electrolyte used to form the gelled electrolyte of the negative electrode contains the alkaline metal hydroxide in an amount from about 26 to about 36 weight percent, for example from about 26 to about 32 weight percent, and specifically from about 26 to about 30 weight percent based on the total weight of the alkaline electrolyte. Electrolytes that are less alkaline are preferred, but can lead to rapid electrolyte separation of the anode. Increase of alkaline metal hydroxide concentration creates a more stable anode, but can reduce high-rate service. In some embodiments having solid ZnO designs, the dissolved ZnO concentrations may be increased significantly. The metal ions in the electrolyte can have a concentration of 0.1-60, 000 ppm. In alternate embodiments, the electrolyte may be neutral or salt-based, as in a zinc-carbon cell.

A gelling agent is preferably utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount of gelling agent present is chosen so that lower rates of electrolyte separation are obtained and anode viscosity in yield stress are not too great which can lead to problems with anode dispensing.

Other components which may be optionally present within the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc.

The negative electrode can be formed in a number of different ways as known in the art. For example, the negative electrode components can be dry blended and added to the cell, with alkaline electrolyte being added separately or, as in a preferred embodiment, a pre-gelled negative electrode process is utilized.

In one embodiment, the zinc and solid zinc oxide powders, and other optional powders other than the gelling agent, are combined and mixed. Afterwards, the surfactant is introduced into the mixture containing the zinc and solid zinc oxide. A pre-gel comprising alkaline electrolyte, soluble zinc oxide and gelling agent, and optionally other liquid components, are introduced to the surfactant, zinc and solid zinc oxide mixture which are further mixed to obtain a substantially homogenous mixture before addition to the cell. Alternatively, in a further preferred embodiment, the solid zinc oxide is predispersed in a negative electrode pre-gel comprising the alkaline electrolyte, gelling agent, soluble zinc oxide and other desired liquids, and blended, such as for about 15 minutes. The solid zinc oxide and surfactant are then added and the negative electrode is blended for an additional period of time, such as about 20 minutes. The amount of gelled electrolyte utilized in the negative electrode is generally from about 25 to about 35 weight percent, and for example, about 32 weight percent based on the total weight of the negative electrode. Volume percent of the gelled electrolyte may be about 62% to about 72% based on the total volume of the negative electrode.

In addition to the aqueous alkaline electrolyte absorbed by the gelling agent during the negative electrode manufacturing process, an additional quantity of an aqueous solution of alkaline metal hydroxide, i.e., "free electrolyte" or "alkaline electrolyte solution," is added to the cell during the manufacturing process. The free electrolyte may be incorporated into the cell by disposing it into the cavity defined by the positive electrode or negative electrode, or combinations thereof. The method used to incorporate free electrolyte into the cell is not critical provided it is in contact with the negative electrode, positive electrode, and separator. In one embodiment, free electrolyte is added both prior to addition of the negative electrode mixture as well as after addition. In one embodiment, about 0.97 grams of 29 weight percent KOH solution is added to an LR6 type cell as free electrolyte, with about 0.87 grams added to the separator lined cavity before the negative electrode is inserted. The remaining portion of the 29 weight percent KOH solution is injected into the separator lined cavity after the negative electrode has been inserted.

This free electrolyte, in an embodiment, comprises the metal additive and is the source of metal ions that will adsorb to the manganese dioxide-containing cathode. In an embodiment, the same metal additive present in the free electrolyte is present in the electrolyte solution incorporated into the cathode. In an embodiment, the free electrolyte has a different concentration of metal additive than does the cathode electrolyte solution. In an alternate embodiment, the free electrolyte and the cathode electrolyte solution have the same concentration of the metal additive. In an embodiment, the metal additive present in the free electrolyte is not present in the cathode.

In an embodiment, the metal additive will be insoluble or have very low solubility in the electrolyte solution at room temperature (~25° C.). In an embodiment, the metal additive will have a solubility of less than $1\times10^{-x}$, where x is from 10-75.

Second electrode 12, also referred to herein as the positive electrode or cathode, preferably includes manganese dioxide (typically as EMD) as the electrochemically active material. EMD is present in an amount generally from about 80 to about 92 weight percent and preferably from about 81 to 85 weight percent based on the total weight of the positive electrode, i.e., manganese dioxide, conductive material, positive electrode electrolyte and additives, including organic additive(s), if present. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed. Second electrode 12 has a ledge 30 and an interior surface 32 as illustrated in FIG. 1. Alternatively, the positive electrode may be formed by pre-forming a plurality of rings from the mixture comprising EMD, and optionally additive(s), and then inserting the rings into the container to form the tubular-shaped second electrode. The cell shown in FIG. 1 would typically include 3 or 4 rings.

The positive electrode can include other components such as a conductive material, for example graphite, that when mixed with the EMD provides an electrically conductive matrix substantially throughout the positive electrode. Conductive material can be natural, i.e., mined, or synthetic, i.e., manufactured. In one embodiment, the cells include a positive electrode having an active material or oxide to carbon ratio (O:C ratio) that ranges from about 12 to about 24. In an embodiment, the O:C ratio ranges from about 12-14. Too high of an oxide to carbon ratio decreases the container to cathode resistance, which affects the overall cell resistance and can have a potential effect on high rate tests, such as the DSC test, or higher cut-off voltages. Furthermore, the graphite can be expanded or non-expanded. Suppliers of graphite for use in alkaline batteries include Timcal America of Westlake, Ohio; Superior Graphite Company of Chicago, Ill.; and Lonza, Ltd. of Basel, Switzerland. Conductive material is present generally in an amount from about 5 to about 10 weight percent based on the total weight of the positive electrode. Too much graphite can reduce EMD input, and thus cell capacity; too little graphite can increase container to cathode contact resistance and/or bulk cathode resistance. An example of an additional additive is barium sulfate ($BaSO_4$), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as coathylene, and calcium stearate.

In an embodiment, the cathode comprises the metal additive as a solid. In an embodiment, the metal additive is present as a solid in the cathode at a concentration of 0.1-1000 ppm compared to the total mass of the cathode.

In some embodiments, the cathode may include nickelate materials as described in U.S. patent application Ser. No. 17/032,496, the subject matter of which is herein incorporated by reference into the present disclosure.

In one embodiment, a positive electrode component (EMD), conductive material, and barium sulfate, and optionally additive(s) are mixed together to form a homogeneous mixture. During the mixing process, an alkaline electrolyte solution, such as from about 37% to about 40% KOH solution, optionally including organic additive(s), is evenly dispersed into the mixture thereby ensuring a uniform distribution of the solution throughout the positive electrode materials. The mixture is then added to the container and molded utilizing a ram. Moisture within the container and positive electrode mix before and after molding, and components of the mix are preferably optimized to allow quality positive electrodes to be molded. Mix moisture optimization allows positive electrodes to be molded with minimal splash and flash due to wet mixes, and with minimal spalling and excessive tool wear due to dry mixes, with optimization helping to achieve a desired high cathode weight. Moisture content in the positive electrode mixture can affect the overall cell electrolyte balance and has an impact on high rate testing.

One of the parameters utilized by cell designers characterizes cell design as the ratio of one electrode's electrochemical capacity to the opposing electrode's electrochemical capacity, such as the anode (A) to cathode (C) ratio, i.e., A:C ratio. For an LR6 type alkaline primary cell that utilizes zinc in the negative electrode or anode and $MnO_2$ in the positive electrode or cathode, the A:C ratio may be greater than 1.32:1, such as greater than 1.34:1, and specifically 1.36:1 for impact molded positive electrodes. The A:C ratio for ring molded positive electrodes can be lower, such as about 1.3:1 to about 1.1:1. The cathode may be ring molded, in some embodiments.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

In other embodiments, an electrochemical cell according to certain embodiments comprises a plurality of cathode portions, and/or a plurality of anode portions. In embodiments where the anode is not centrally located within the cell, or in embodiments in which the electrochemical cell includes multiple anode portions that are not in contact with one another, a current collector may take a different shape other than a linear rod. For example, a current collector may have a bent shape, an off-center position, and/or other modifications to electrically connect the anode with the appropriate terminal of the electrochemical cell. Examples of such configurations are described in U.S. Patent Publ. No. 2020/0411878, the contents of which are incorporated herein by reference in their entirety. It should be understood that the embodiments discussed herein with respect to hybrid current collector configurations may be utilized with current collectors having different positions and/or shapes.

Example Hybrid Current Collectors

Increasing the surface area of a current collector in an electrochemical cell may lead to increased performance for high rate electronic devices that are connected to the electrochemical cell. However, an increase in current collector surface area may require a corresponding decrease in the volume of anode material within the cell (e.g., by removing anode gel from the electrochemical cell) to accommodate the increased volume of the current collector. Hence, the increased current collector surface area may lead to decreased performance in low rate devices. It is believed that this decreased performance can be mitigated or eliminated if at least a portion of the current collector's increased surface area is composed of zinc, while the remainder of the current collector is composed of a brass alloy. Various examples of this hybrid current collector composed of brass and zinc will now be described and shown in various figures.

Figure 2A:
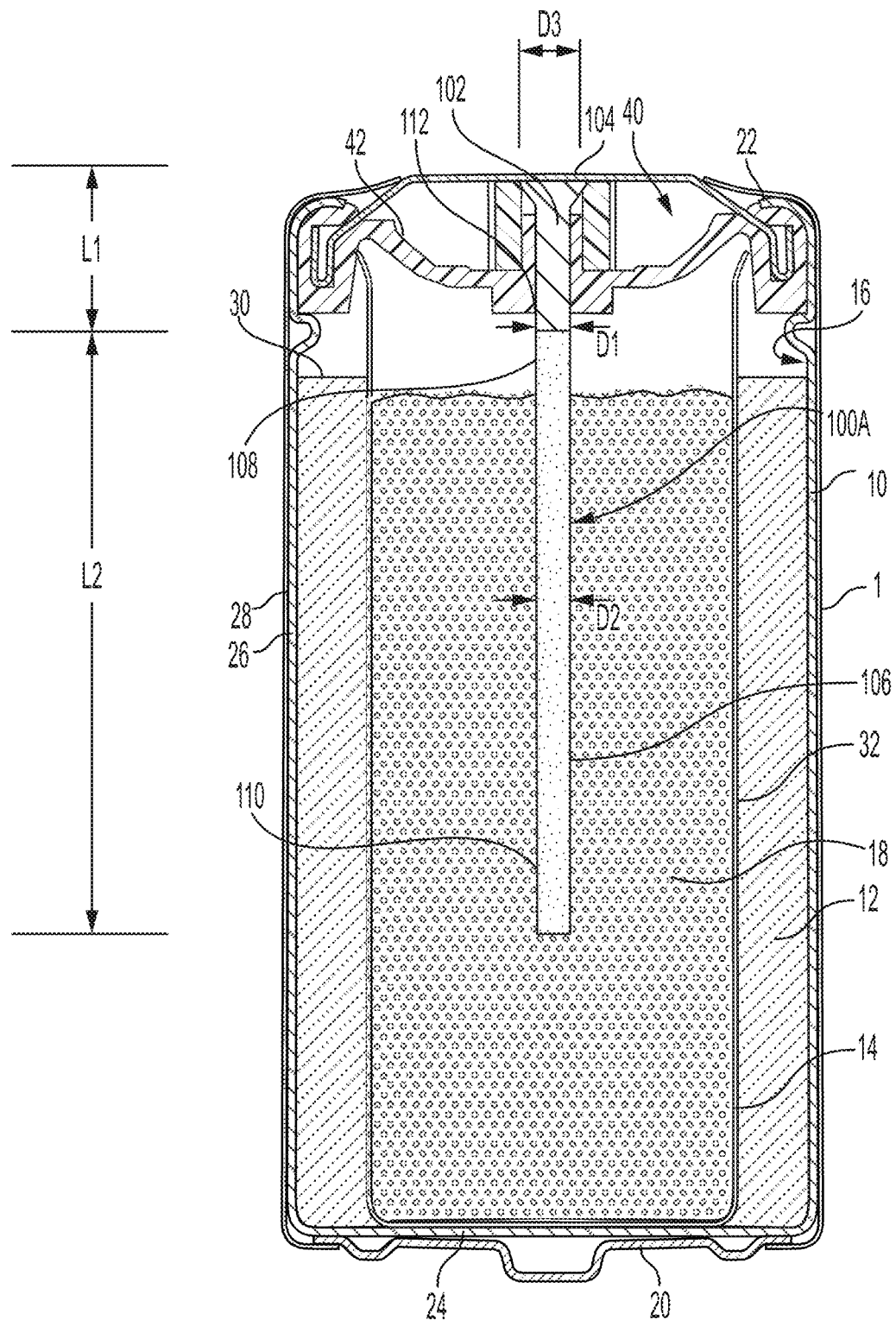
FIG. 2A is a side view of an example anode current collector in accordance with some embodiments.
Figure 2B:
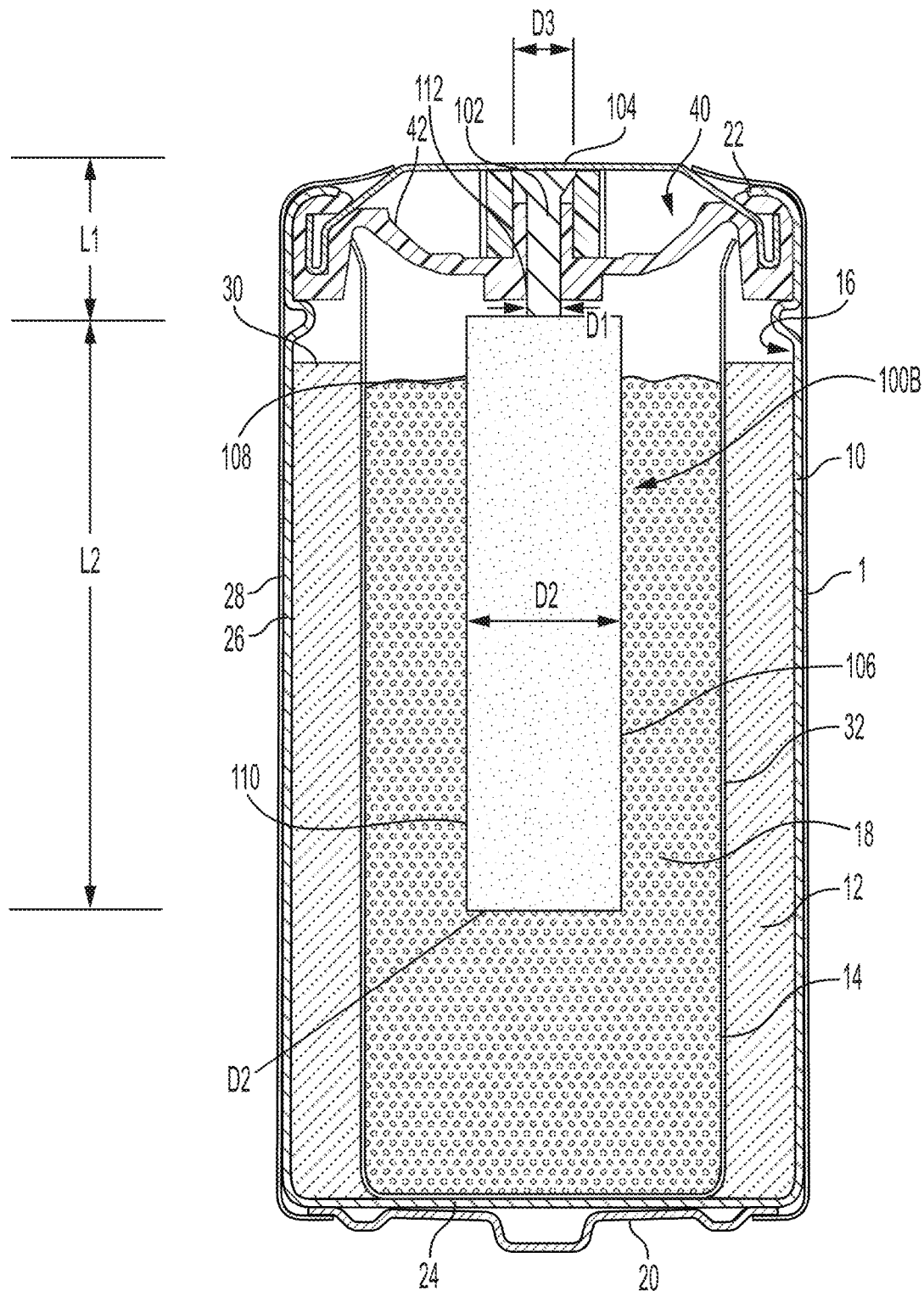
FIG. 2B is a side view of an example anode current collector in accordance with some embodiments.

FIGS. 2A and 2B show side views of example hybrid anode current collectors 100A and 100B including two material portions, including zinc material portions attached to a base portion. It will be understood that the description provided above with respect to FIG. 1 with respect to the described usage and placement of current collector 44 is applicable to the current collector variations shown in FIGS. 2A-2B. Thus, current collectors 100A and 100B shown in FIGS. 2A-2B may be inserted into and utilized with the electrochemical cell 1 of FIG. 1, without changing the functionality of the electrochemical cell or assembly thereof. To the extent that a hybrid current collector 100A, 100B is volumetrically larger than a current collector 44 without the multiple material portions (e.g., a larger zinc component, such as shown with respect to the current collector 100B shown in FIG. 2B, including zinc component 106 may be volumetrically larger than the current collector 44 shown in FIG. 1), an equivalent volume of anode material may be removed from the electrochemical cell (as shown and described in FIG. 1) such that the contents of the electrochemical cell 1 can volumetrically fit within the cell, while maintaining adherence to applicable size requirements of a particular electrochemical cell. In other words, the collective volume of the anode material and current collector should remain at least approximately the same, regardless of the volumetric size of the current collector utilized. Failure to keep the collective volume of the anode material and the current collectors 100A, 100B approximately the same may lead to overfilling the cell 1 as a result of the reduced void volume. This may lead to processing problems or leakage.

In the illustrated embodiments of FIGS. 2A-2B, the current collector 100A, 100B has an elongated, rigid body. The current collector 100 may range in length from about 28 mm to about 33 mm in length for an LR6 electrochemical cell, though it will be understood that the current collector 100 may be greater than 33 mm in length or less than 28 mm in length depending on the desired design and/or cell size. In embodiments where the current collector 100A, 100B has a circular cross-section (taken perpendicular to the length of the current collector), the current collector 100 may have a diameter ranging from 1 mm to 3 mm for use within an LR6 electrochemical cell. The diameter may be greater than 3 mm or less than 1 mm, depending on the desired design. In some embodiments, improved high rate performance may be achieved with the hybrid current collector configuration, including a zinc component. In some embodiments, the zinc components 106 may provide increased interfacial contact between the anode material and current collector. In some embodiments, to the zinc component 106 may operate as additional active materials in an example electrochemical cell 1 and thereby increase the total percentage of zinc within the anode of the example electrochemical cell.

In the illustrated embodiments, the example anode current collector 100A, 100B includes a base 102 for connection with the battery terminal. In some embodiments, the base 102 may be an elongated, rigid body. In some embodiments, the base 102 may have uniform cross-sectional dimension along its length, from a first end (to be attached to a cell terminal) to a distal second end. In other embodiments, the base 102 has a cross-sectional dimension/shape that varies along its length. In some embodiments, the base 102 may have a circular cross-section. In some embodiments, the cross-section of the base 102 may maintain the same diameter along the length of the base 102, but in other embodiments the diameter may vary along the length of the base 102 (e.g., the diameter may increase or decrease in size moving down the length of the base 102). In other embodiments, the base 102 may have a square or rectangular cross-section. It will be understood that the cross-section and length of the base 102 may have a variety of length and cross-sectional shapes to conform to desired design requirements.

The base may comprise a first material, and may have a consistent material composition along its entire length. In some embodiments, the first material may be a metal, metallic, or other conductive material. For example, the first material of the base 102 may be a brass alloy or other metallic/conductive material that can be welded to a steel terminal of an electrochemical cell and which can conduct electricity from the anode. In various embodiments, the copper content of the brass alloy may range from about 63 percent to about 70 percent. For certain electrochemical cells, the terminal may comprise a material other than steel, and the base 102 may be fixedly attached to the terminal in other ways besides welding. In some embodiments, the base 102 may include a head 104 at the first end of the base, and having a short length and a larger diameter than the remainder of the base 102. In some embodiments, the head 104 has an enlarged flat surface defining the first end of the base 102 for welding (or otherwise attaching) the base to the steel terminal. In some embodiments, the head 104 may be made of the same material as the base 102. In such embodiments, the head is integrally formed with the remainder of the base 102 such that the base 102 and the head 104 may be molded, cast, or otherwise formed as a single piece. In some embodiments, the base 102 may have a different cross-sectional shape/size than the head 104 (e.g., square head 104 on a circular base 102).

In some embodiments, the current collector 100 may include a zinc component 106 that is attached to the base 102. The zinc component 106 may have a circular, solid cross-section (taken perpendicular to its length, which is parallel with the length of the base 102). In other embodiments, the zinc component 106 may have a different cross-sectional shape, such as square, rectangular, thin (e.g., as a sheet), hollow, and/or the like. In some embodiments, both the base 102 and the zinc component 106 are cylindrically shaped. In some embodiments, the zinc component 106 is attached such that the current collector 100A, 100B maintains a uniform cross-sectional shape (e.g., circular) and diameter. In some embodiments, the zinc component 106 comprises one or more zinc plates that have been welded or otherwise conductively attached to the base 102. In some embodiments, the one or more zinc plates may be non-uniform in length and diameter. In some embodiments, the zinc component 106 may be a deformable zinc alloy that is about 99.99% pure zinc. In some embodiments, the zinc component 106 may have be an alloy having a similar composition to the zinc powder in the anode gel, and the component 106 may include elements to inhibit gassing, such as indium, bismuth, lead, or aluminum. In some embodiments, the zinc component 106 may be a sheet or sleeve (e.g., a rolled zinc sheet) of zinc alloy. In some embodiments, the zinc component 106 may have a uniform shape and size along its length, between a first end (that may be attached to the distal end of the base 102 in certain embodiments) and an opposite second end, but in other embodiments the zinc component 106 may have a non-uniform shape (e.g., the zinc component 106 may have ridges, bumps, and/or holes distributed throughout its surface area). In some embodiments, the zinc component 106 may be a hollow cylinder with an open end into which the base 102 may be partially inserted to form a friction fit (and/or to be crimped). In other embodiments, the zinc component 106 may be soldered to the base 102. In other embodiments, the zinc component 106 may be a solid rod, and the second end of the base 102 may be a hollow cylinder with an open end into which the zinc component 106 is partially inserted to form a friction fit (and/or to be crimped). In some embodiments, the zinc component 106 may be hollow along a part or the entirety of its length, while in other embodiments the zinc component 106 may be solid throughout. In some embodiments, the zinc component 106 may be a series of concentric rings arranged around the base 102 at different locations along the length of the base 102. In some embodiments, the zinc component 106 may be a plurality of strips attached and arranged symmetrically around the base 102 (for example, each strip may be attached to the base 102 and may have a length at least substantially parallel with the length of the base 102). In some embodiments, the zinc component 106 may have a diameter D2 that varies along its length L2 between the first end and the second end of the zinc component 106.

The zinc component 106 may be attached to the base 102 in a variety of ways. In some embodiments, the zinc component 106 may be fixedly or removably attached at one or more points on the base 102 of the current collector 100 to ensure conductivity between the base 102 and the zinc component 10 so as to maintain conductivity between the cell terminal, the base 102, and the zinc component 106. In some embodiments, the zinc component 106 may have a proximal end 108 (first end) and a distal end 110 (second end). In some embodiments, the zinc component 106 may be attached to a second, distal end of the base 102 at the proximal end 108 of the zinc component 106 (providing an end-to-end attachment relationship between the zinc component 10 and the base 102). In some embodiments, the proximal end 108 of the zinc component 106 may have an attachment feature for connecting to the base 102. In some embodiments, the base may also have a distal end 112 (second end) (disposed on the opposite end of the head 104, which is located at the first end) that may have a corresponding attachment component for connecting to the proximal end 108 of the zinc component 106. In some embodiments, the zinc component 106 may be welded to the base 102 (e.g., proximal end 108 may be welded to distal end 112). In some embodiments, the welding may be ultrasonic welded. In other embodiments, the welding may be electric welding or friction welding. In some embodiments, the zinc component 106 may be attached to the base 102 by friction fit, either by proximal end 108 to distal end 112, or by attaching to another location of the base 102. In other embodiments, the zinc component 106 may be crimped to the base 102.

The base 102 and the zinc component 106 may have a variety of orientations. In some embodiments, the zinc component 106 may have a different cross-section than the base 102 (e.g., the zinc component 106 may have a square cross section while the base 102 may have a circular cross-section). Various current collectors having zinc components 100A, 100B are shown in FIGS. 2A and 2B. Referring to both 100A and 100B, in some embodiments, the zinc component 106 may have a length L2 that is longer than the length L1 of the base 102. However, in some embodiments, the zinc component 106 may have a length less than the length of the base 102. In other embodiments, the length of the zinc component 106 may be equal to the length of the base 102. As described above, the current collector 100 may range from about 5 mm to about 40 mm in length for an LR6 cell. In some embodiments, zinc component 106 may comprise about 75% of that length (about 4 mm to about 30 mm) and the base 102 may comprise about the remaining 25% of the length of the current collector 100 (about 1 mm to about 10 mm). It will be understood that the zinc component 106 and the base 102 may have various ratios of the length of the current collector 100. In certain embodiments, length L2 may be twice the length L1. In other embodiments, the length L2 may be 1.5 times the length L1. The ratio between length L2 and length L1 may between 0.25:1 (with the zinc component 106 having a length that is ¼ the length of the base 102), to 5:1 (with the zinc component 106 having a length that is 5× the length of the base 102). More preferably, the ratio between length L2 and length L1 may be between 1:1 to 2:1.

As described above, the current collector 100 may have a diameter ranging from about 1 mm to about 3 mm. Referring to FIG. 2A, in some embodiments, the diameter D1 of the base 102 may be equal to the diameter D2 of the zinc component 106. However, referring to FIG. 2B, in some embodiments, the current collector 100B have a larger diameter D2 at its zinc component 106 than the diameter D1 of the base 102. In some embodiments, the diameter D2 of the zinc component 106 may be greater than the length L2 of the zinc component 106, and vice-versa (as shown in at least FIGS. 2A and 2B). In various embodiments, the ratio of the diameter D2 to the diameter D1 may be between 1:1 (the zinc component 106 has a diameter equal to the diameter of the base 102) and 10:1 (the zinc component 106 has a diameter that is 10× the diameter of the base 102). In some embodiments, the diameter D3 of the head 104 may be greater than both diameters D1 and D2 of the base and zinc component 102, 106, respectively. However, in other embodiments, the diameter D3 of the head may be less than or equal to the diameter of the zinc component. In some embodiments, the zinc component 106 may have a diameter much greater than the diameter of the base 102, so long as the diameter of the zinc component 106 does not exceed the diameter of the cavity containing the anode.

FIGS. 3A-3C and 4A-C show an example current collector 100 with an attached zinc component 106 where the zinc component 106 is embodied as one or more zinc foil sheets attached at one or more points on the base. In some embodiments, the foil may be about 1 mm thick foil and about 99.99% pure zinc from sigma Aldrich. In some embodiments, the zinc foil may be cut to suitable size and dimensions by ceramic scissors (to prevent contamination). While zinc foil was used in FIGS. 3A-3C and 4A-C, in some embodiments zinc wire or zinc meshes may be used. In other embodiments, a zinc allow similar to the zinc used for zinc powder as previously described in this disclosure may be used. It will be understood that a wide variety of zinc components may be utilized in the current collector 100A, 100B, depending on the desired design of the current collector 100A, 100B. FIGS. 3A-3C and 4A-4C show this example current collector 100 with attached zinc foil 106 inside of example electrochemical cells (such as the cell 1 shown in FIG. 1). In some embodiments, the zinc component 106 may be one or more pieces of zinc foil. In some embodiments, the zinc foil may be pierced at one or more points along the length of the zinc foil to form pass-throughs. The base 102 is thereby threaded through the pass-throughs to be fixedly attached via a friction fit. The pass-throughs may be at least substantially aligned (e.g., centrally located relative to a width of the foil (the width being measured perpendicular to the length of the foil)), such that upon passing the base 102 through the pass-throughs, the zinc component 106 is at least substantially parallel with the base 102. In some embodiments, the zinc component 106 may be adhered to the base 102 by a suitable adhesive. In some embodiments, the adhesive may be a conductive adhesive. In some embodiments, the adhesion may take the form of a zinc component 106 that is adhered along the exterior of the base 102 (e.g., in embodiments where the zinc component 106 is a sheet of zinc, one or more pieces of foil, or zinc plates). In other embodiments, the adhesion may take the form of a zinc component 106 that is adhered at one end of the zinc component 106 to an adjoining end of the base 102 (e.g., in embodiments where the zinc component 106 is a rod or cylindrical structure). For example, in some embodiments, conductive adhesive may be applied to proximal end 108 and/or distal end 112 of the zinc component 106 to connect the zinc component 106 and the base 102.

Figure 3A:
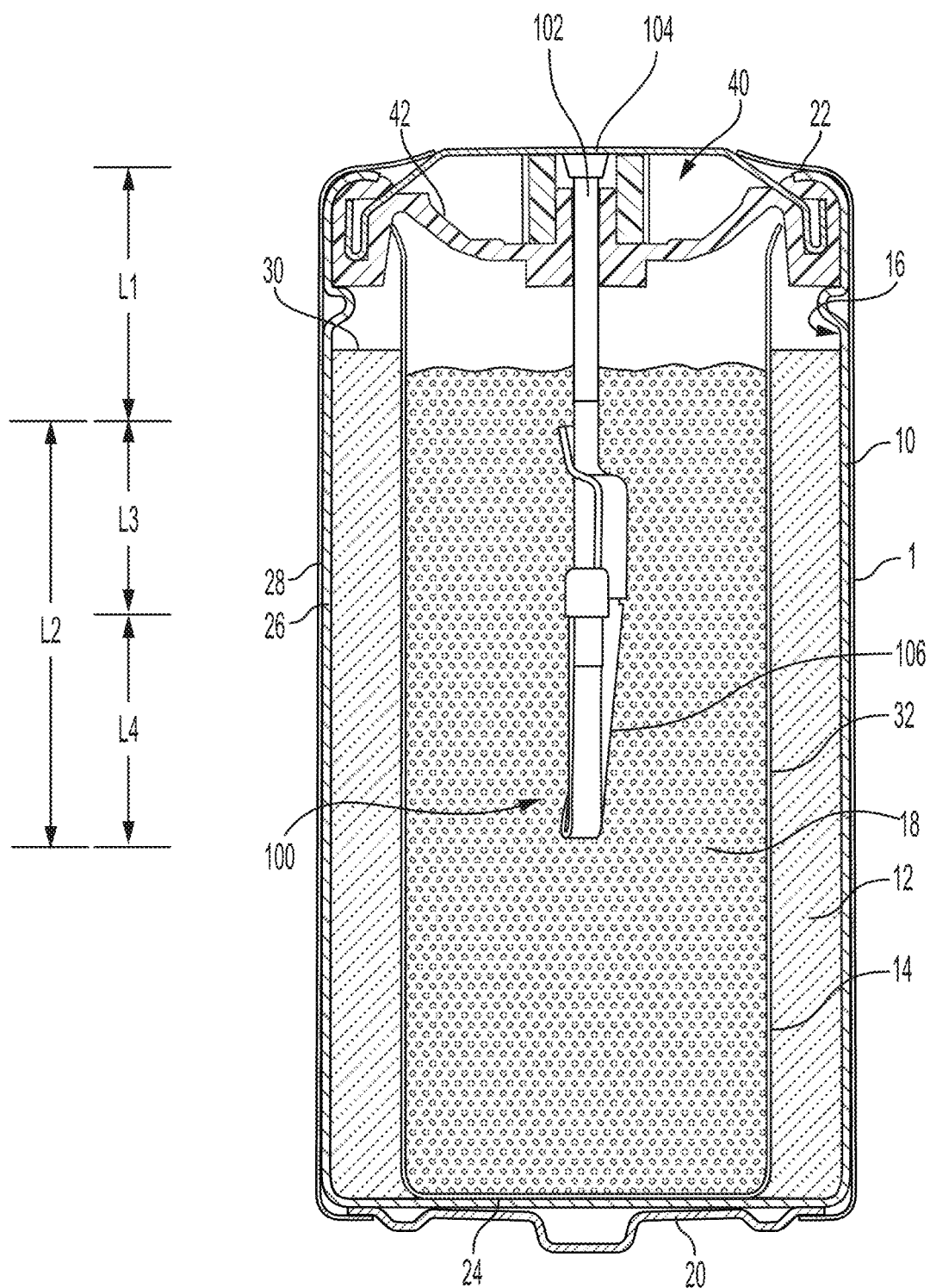
FIG. 3A is a view of a first example anode current collector with a zinc foil attached in accordance with some embodiments.

Beginning with FIG. 3A, a zinc component 106 may be embodied as a thin zinc foil sheet having a width that is approximately equal to a diameter of the base 102. For example, the width of the zinc foil sheet may be between approximately 2 mm-5 mm. As shown in FIG. 3A, the zinc foil sheet may be folded to form one or more friction-fit features, such as slits, clips, and/or the like that are each configured to frictionally engage the base 102. Moreover, these friction-fit features are configured such that the zinc foil maintains a desired position along the length of the base 102, however the positioning of the zinc foil may be adjusted relative to the base. As shown in FIG. 3A, the zinc foil may be located proximate the distal end of the base 102, such that the portion of the base 102 located between the head and the first end of the zinc foil (the nonoverlapping portion of the base) is longer than the portion of the base 102 located between the distal end of the base 102 and the first end of the zinc foil (the overlapping portion of the base). As shown, the zinc foil extends beyond the distal end of the base 102. In certain embodiments, the zinc foil additionally defines an overlapping portion (coextensive with the overlapping portion of the base 102, corresponding to a length of the zinc portion that overlaps with a length of the base 102) and a non-overlapping portion (the portion of the zinc sheet that extends beyond the distal end of the base). The non-overlapping portion of the zinc foil may have a length L4, that is shorter than the non-overlapping portion of the base L1. Moreover, the overlapping portion of the zinc foil (and base 102) L3 may be shorter than both L1 and L4. In other embodiments, the overlapping portion of the zinc foil L3 may be longer than L1 and/or L4. In such embodiments, the zinc foil is moved closer to the first end of the base 102.

As also shown in FIG. 3A, the zinc foil may be folded at its distal end, such that an end of the zinc foil is folded back toward the first end of the base 102. Such a configuration creates a larger surface area of the zinc component 106 that may contact the anode material, while maintaining an overall length of the current collector 100 that is sufficiently short as to fit within the anode of the electrochemical cell.

Figure 3B:
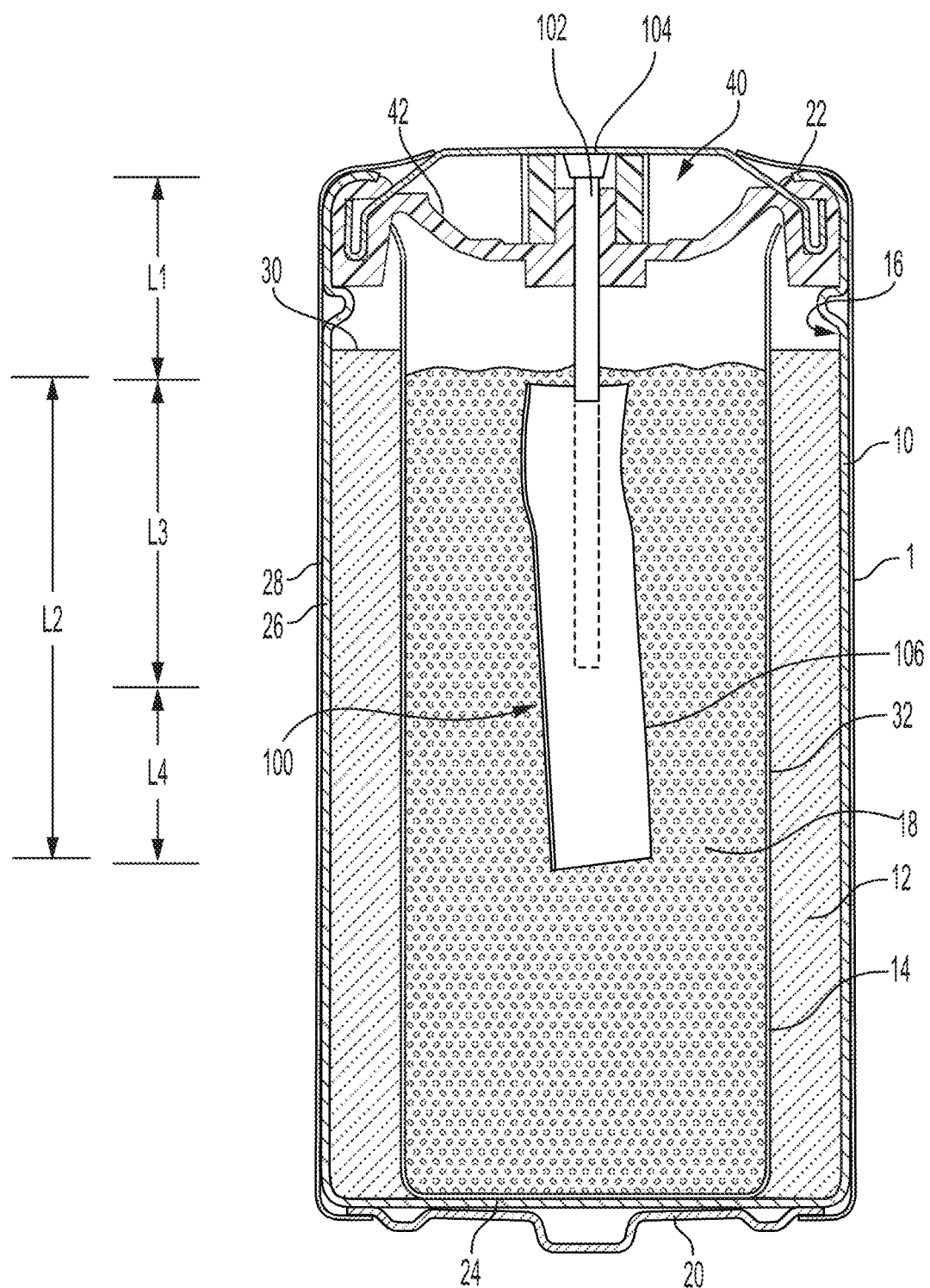
FIG. 3B is a view of a second example anode current collector with a zinc foil attached in accordance with some embodiments.
Figure 3C:
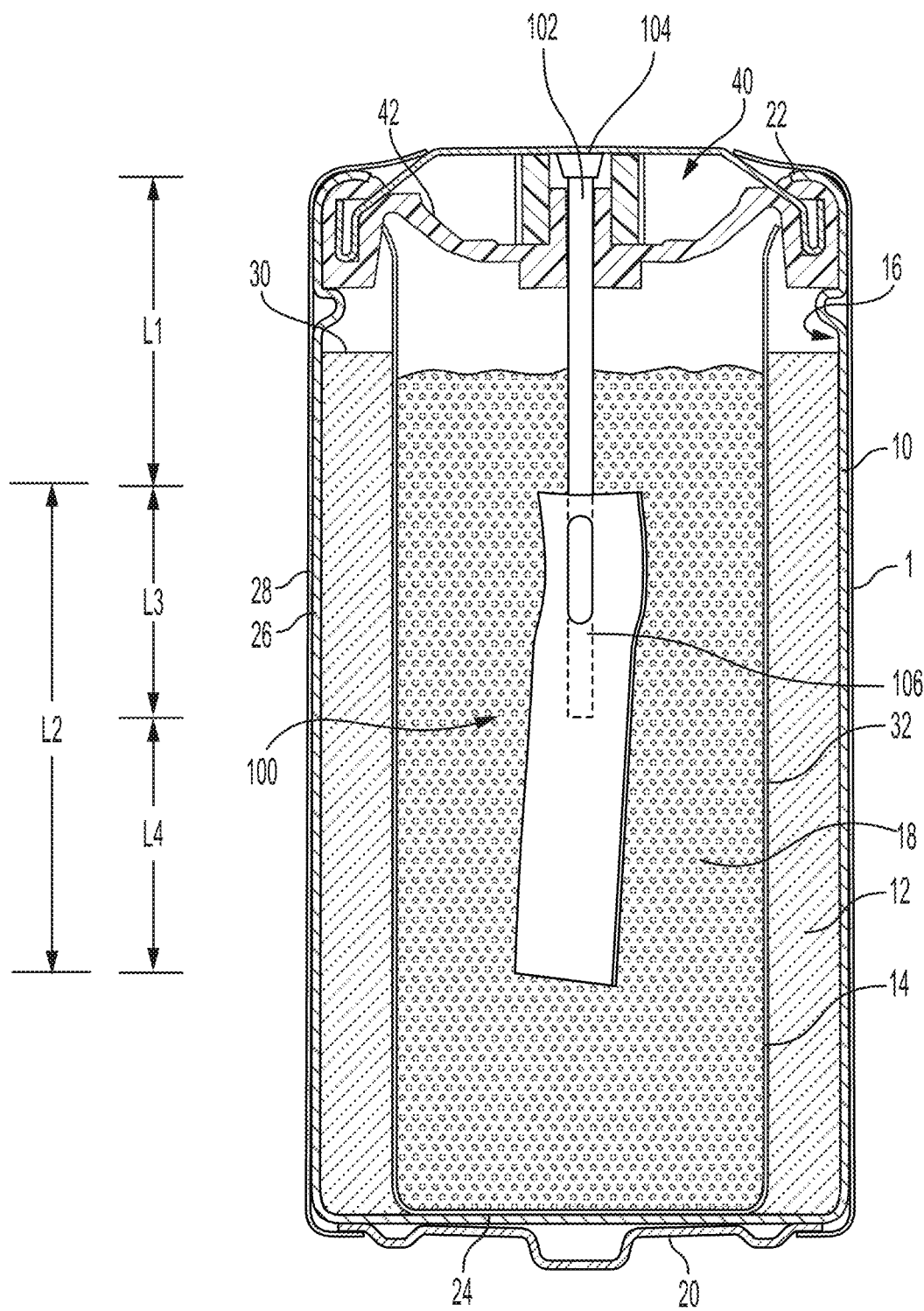
FIG. 3C is a view of a second example anode current collector with a zinc foil attached in accordance with some embodiments.

FIGS. 3B and 3C show alternative configurations of a zinc foil, in which the zinc foil has a width substantially larger than the diameter of the base 102. For example, the zinc foil may have a width of between 5 mm-10 mm. Additionally, the zinc foil may be bent in one or more waves, so as to increase the surface area of the zinc component while maintaining a desired length of the current collector to fit within the anode of the electrochemical cell. In the embodiment of FIGS. 3B-3C, only a single "wave" is bent into the shape, between two frictional attachment points for connecting the zinc component 106 with the base 102.

As shown in each of FIGS. 3B and 3C, the zinc foil may have a substantially rectangular shape, with one end of the rectangle at the first end of the zinc component 106 and the second end of the rectangle at the second end of the zinc component 106. Moreover, as shown in FIGS. 3B and 3C, the ratios between the nonoverlapping portion L1 of the base 102 and the overlapping portion label in both figures of the base 102 may be adjusted. In FIG. 3B, the overlapping portion L3 is longer than each of the non-overlapping portion L1 of the base and the non-overlapping portion L4 of the zinc component (the portion extending beyond the distal end of the base 102, the location of the distal end of the base is shown with a dashed line in FIGS. 3B-3C, since it is located behind the zinc component 106. In FIG. 3C, the overlapping portion L3 is shorter than the non-overlapping portion L1 of the base.

Figure 4A:
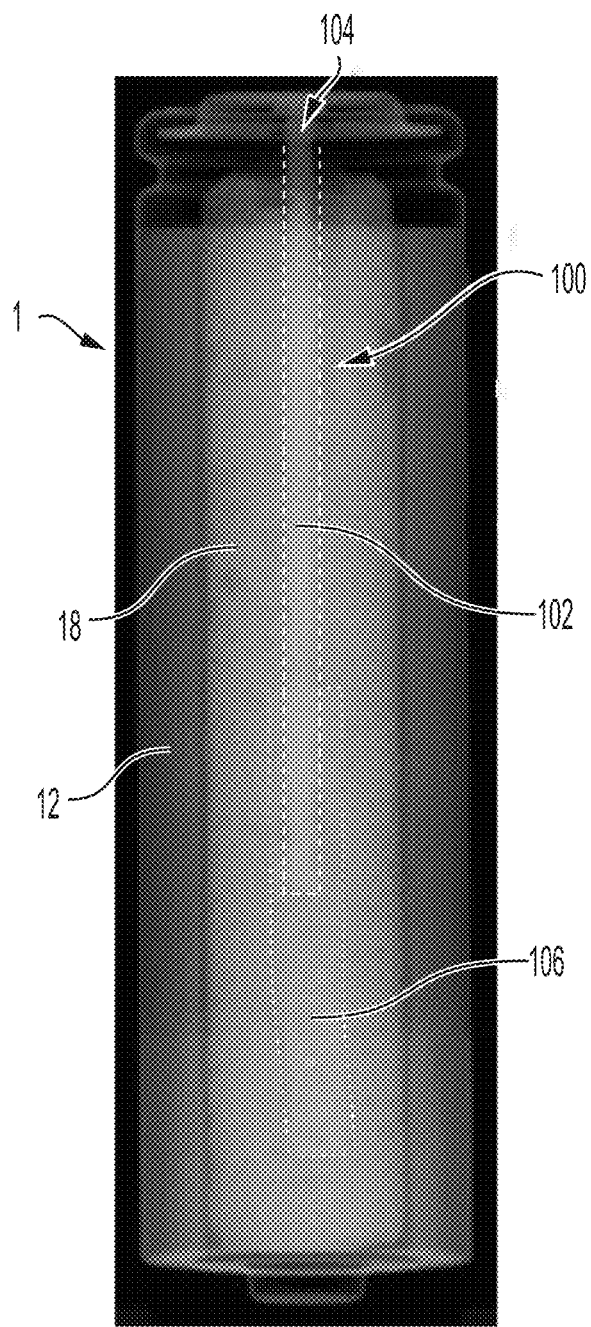
FIG. 4A is an x-ray view of a first example anode current collector with a zinc component in an electrochemical cell in accordance with some embodiment.
Figure 4B:
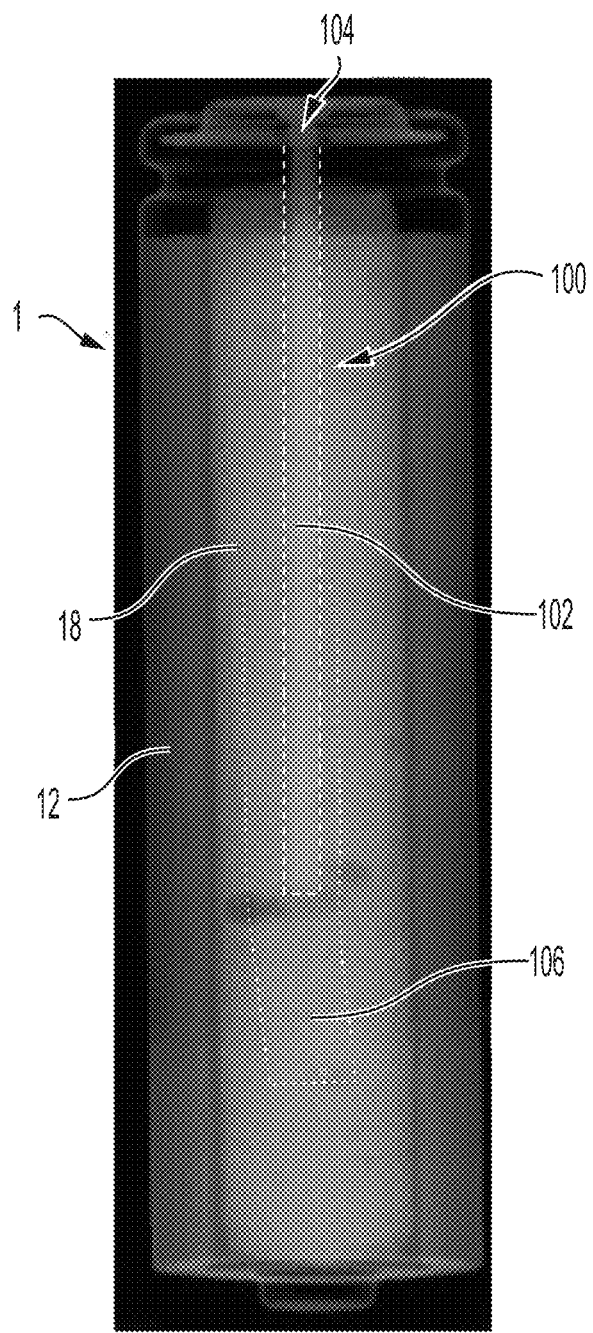
FIG. 4B is an x-ray view of a second example anode current collector with a zinc component in an electrochemical cell in accordance with some embodiment.
Figure 4C:
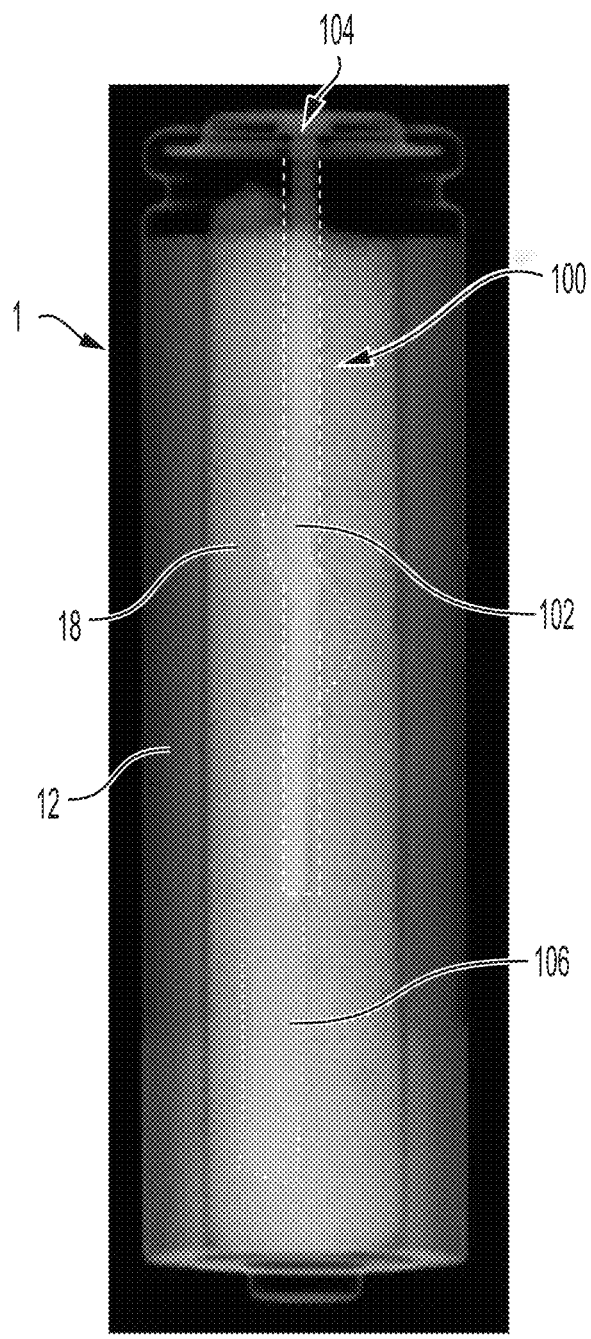
FIG. 4C is an x-ray view of a third example anode current collector with a zinc component in an electrochemical cell in accordance with some embodiment.

As can be seen in FIGS. 4A-C, the base 102 is inserted into the anode 18 along with the zinc component 106. In some embodiments, the zinc foil 106 may be folded around and along the base 102. In some embodiments, the zinc foil 106 may be folded in half, and the base 102 may be inserted through the fold, with each end of the zinc fold 106 extending beyond the distal end of the base 102. In some embodiments, a second zinc foil 106 may be folded in half and similarly attached to the base, thereby forming four zinc flaps positioned at set angles toward each other. For example, in this embodiment, the zinc flaps may be oriented at 90 degrees toward each other, with each zinc flap extending downward, past the distal end of the base 102. In other embodiments, one or more pieces of zinc foil 106 may be wrapped around the base 102 without being folded.

Experimental Results

FIG. 5 is a table illustrating example test results for testing LR6 cells with various current collectors utilizing a zinc component. To convert from "pulses" to minutes, multiply the number of minutes by 2; that is, 50 minutes equals 100 pulses. A "pulse" represents the amount of time a device runs above a certain voltage threshold while connected to one of the various LR6 cells. For example, one pulse is measured as the time during which a device is connected to an example cell and draws a voltage greater than a threshold of 1.05V. The column on the far left of the table indicates the test conditions of the cells. These test conditions indicate the device used, as well as the type of test used (speed of level of current draw and amount of continuous usage in a defined time period). Each of the next columns describe test results for each cell type. The second column is a control column, describing the functionality of a typical cell using a traditional brass-alloy current collector (without any zinc component). This cell type is used for comparison with the various cells under test.

Each of the tested cells included the same chemistry, inclusive of the same cathode (and quantity of cathode), the same separator (and separator thickness), and the same anode. The amount of anode material varied to the extent necessary to accommodate zinc components of the current collector. In other words, as compared with the "control" tested cell, a volume of anode material was removed from each of the "thin zinc" and "wide zinc" test cells that is volumetrically equivalent to the volume of the respective zinc components. Regarding the cells used in the tests, the "Control" cell was a Base LR6 cell with a brass alloy current collector. The "Thin Zinc" was an LR6 cell, with the same internal components as the Control LR6 cell, but including 0.164 g of zinc foil attached to a brass alloy current collector. A volumetrically equivalent amount of anode material was removed (as compared with the Control cell) to accommodate the addition of the zinc foil. The "Wide Zinc" and "Wide Zinc Downshifted" were LR6 cells, with the same internal components as the Control LR6 cell, but including 0.307 g of zinc foil attached to a brass alloy current collector. A volumetrically equivalent amount of anode material was removed (as compared with the Control cell) to accommodate the addition of the zinc foil. The brass alloy portions of the current collector in each of the Thin Zinc and Wide Zinc cells was identical to the brass alloy current collector used in the Control cell (in composition, size, shape, and dimensions).

In each cell the cathode consisted of: electrolytic manganese dioxide (EMD), graphite powder, polyethylene (PE) binder, barium sulfate, as well as various additives, potassium hydroxide solution, and distilled water.

Each cell used identical materials within the anode. As mentioned however, a volume of anode was removed from the "Thin Zinc," "Wide Zinc, and "Wide Zinc Downshifted" cells (as compared with the "Control" cell) to accommodate the zinc added to the current collector. The anode of each cell consisted of granular zinc powder, a gelling additive, as well as various additives, surfactants, zinc oxide, potassium hydroxide solution, and distilled water. The mixture encompassing the anode material was uniformly mixed, so that the removal of anode material in each of the thin zinc and wide zinc configurations is implemented as a removal of a small amount of each component of the anode material. As reflected in FIGS. 5, the Thin Zinc cells included 1.1% less anode material as compared with the Control cell. The Wide Zinc cells included 2% less anode material as compared with the Control cell. An example of the current collector used in the "Thin Zinc" configuration is shown in FIG. 3A and FIG. 4A. An example of the current collector used in the "Wide Zinc" configuration is shown in FIG. 3B and FIG. 4B. An example of the current collector used in the "Wide Zinc, downshifted" configuration is shown in FIG. 3C and FIG. 4C. The brass-alloy portion of the example current collector 100 used in testing was 29 mm long (this was used in both the Control and test cells, including the thin zinc and wide zinc test cells). 10 electrochemical cells were tested for each combination of cell type (i.e., 10 cells for "Thin Zinc," 10 for "Wide Zinc," 10 for "Wide Zinc, Downshifted," etc.) and device and the data provided within the table reflects an average of each set of 10 tests.

Referring now to FIG. 5, for each cell, the number in the top left of each box in the table indicates the time for which the device ran during the test (inclusive of all periods of operation, even if separated by gaps in runtime) before the cell was incapable of running the device. For example, for "Digital Camera," the device ran for 128 pulses for the Control cell, 144 pulses for "Thin Zinc," 152 for "Wide Zinc," and 152 pulses for "Wide Zinc Downshifted." For each cell, the bottom right percentage indicates increased performance over the Control (improvements in performance reflected here as percentage increase in running time over the Control running time). As can be seen in the table, and as described previously in this disclosure, improved high rate performance (reflected in the Digital Camera and Grooming tests) was achieved with the hybrid current collector configurations of the Thin Zinc and Wide Zinc test cells, as compared with the Control cell. As shown with respect to the results of the Digital Camera and Grooming tests, cells including a current collector with an attached zinc foil sheet 106 demonstrated improved high-rate performance (DSC/Grooming). Furthermore, cells including a current collector with an attached zinc foil sheet 106 did not experience a corresponding loss in low-rate performance (CD/MD/Game, Digital Audio, Remote Radio). In the bottom row of the table is the average percentage increase in performance reflected across all of the devices tested for each cell. As can be seen in the table, each cell showed an improved performance on average over the control, and each cell showed improved or equivalent performance to control for each device.

All of the references cited above, as well as all references cited herein, are incorporated herein by reference in their entireties.

While embodiments have been illustrated and described in detail above, such illustration and description are to be considered illustrative or exemplary and not restrictive. It will be understood that changes and modifications may be made by those of ordinary skill within the scope and spirit of the following claims. Embodiments include any combination of features from different embodiments described above and below.

The embodiments are additionally described by way of the following illustrative non-limiting examples that provide a better understanding of the embodiments and of its many advantages. The following examples are included to demonstrate preferred embodiments. It should be appreciated by those of skill in the art that the techniques disclosed in the examples which follow represent techniques used in the embodiments to function well in the practice of the embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the embodiments.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

What is claimed is:

1. An electrochemical cell comprising:
a container,
a ring-shaped cathode disposed within the container, wherein the ring-shaped cathode defines an open interior;
an anode disposed within the open interior of the ring-shaped cathode;
a separator disposed between the ring-shaped cathode and the anode;
an electrolyte solution; and
a current collector electrically connected with a portion of the container, wherein the current collector is positioned at least partially within the anode, and wherein the current collector comprises:
a base comprising a first material and fixedly attached to the portion of the container, wherein the base defines at least a portion of an exterior surface of the current collector; and
a zinc component comprising a second material, wherein the zinc component is fixedly attached to the base and is in contact with the anode.

2. The electrochemical cell of claim 1, wherein the zinc component comprises one or more pieces of zinc foil that are fixedly attached at one or more points on the base of the current collector.

3. The electrochemical cell of claim 1, wherein the zinc component is one of: welded, soldered, friction fit, or crimped to the base.

4. The electrochemical cell of claim 3, wherein the zinc component is welded to the base by a welding method selected from a group consisting of: ultrasonic welding, electric welding, and friction welding.

5. The electrochemical cell of claim 1, wherein the zinc component is fixedly attached to the base such that at least a surface area of the base is encased within the zinc component.

6. The electrochemical cell of claim 5, wherein the base is cylindrically shaped, and wherein the surface area of the base that is encased within the zinc component is greater than a surface area of the base that is not encased within the zinc component.

7. The electrochemical cell of claim 6, wherein the surface area of the base that is encased within the zinc component forms a cylinder with a diameter larger in diameter than a cylinder formed by the surface area of the base that is not encased within the zinc component.

8. The electrochemical cell of claim 1, wherein the zinc component comprises one or more zinc plates that are fixedly attached at one or more locations on the base.

9. The electrochemical cell of claim 1, wherein the first material comprises a brass alloy.

10. The electrochemical cell of claim 1, wherein the anode comprises a first portion and a second portion, wherein the first portion comprises a first anode material and the second portion comprises a second anode material.

11. The electrochemical cell of claim 1, wherein the base ranges from about 20 mm to about 40 mm in length.

12. The electrochemical cell of claim 1, wherein a design of the ring-shaped cathode and the anode utilizes a high zinc loading design of about 62% to 72% by weight.

13. A current collector electrically connected with a portion of a container, wherein the current collector is positioned at least partially within an anode, and wherein the current collector comprises:

a base fixedly attached to the portion of the container, wherein the base defines at least a portion of an exterior surface of the current collector; and a zinc component comprising a second material, wherein the zinc component is fixedly attached to the base and defines at least a second portion of the exterior surface of the current collector.

14. The current collector of claim 13, wherein the zinc component comprises one or more pieces of zinc foil that are fixedly attached at one or more points on the base.

15. The current collector of claim 13, wherein the zinc component is one of: welded, soldered, friction fit, or crimped to the base.

16. The current collector of claim 13, wherein the zinc component is welded to the base by a welding method selected from a group consisting of: ultrasonic welding, electric welding, and friction welding.

17. The current collector of claim 13, wherein the zinc component is fixedly attached to the base such that at least a surface area of the base is encased within the zinc component.

18. The current collector of claim 17, wherein the base is cylindrically shaped, and wherein the surface area of the base that is encased within the zinc component is greater than a surface area of the base that is not encased within the zinc component.

\* \* \* \* \*